United States Patent
Brunken, Jr.

(10) Patent No.: US 8,021,116 B2
(45) Date of Patent: Sep. 20, 2011

(54) MULTI-BLADED ROTOR SYSTEM FOR ROTORCRAFT

(75) Inventor: John E. Brunken, Jr., Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 12/742,711

(22) PCT Filed: Dec. 3, 2007

(86) PCT No.: PCT/US2007/086266
§ 371 (c)(1),
(2), (4) Date: May 13, 2010

(87) PCT Pub. No.: WO2009/073022
PCT Pub. Date: Jun. 11, 2009

(65) Prior Publication Data
US 2010/0264257 A1    Oct. 21, 2010

(51) Int. Cl.
B64C 27/54    (2006.01)

(52) U.S. Cl. .................................. 416/159; 244/17.25

(58) Field of Classification Search .................. 416/155, 416/159, 162, 163, 164, 134 A; 244/17.11, 244/17.13, 17.25
See application file for complete search history.

(56) References Cited

U.S. PATENT DOCUMENTS

| | | | | |
|---|---|---|---|---|
| 3,684,398 A | * | 8/1972 | Davidson et al. | 416/155 |
| 3,700,351 A | * | 10/1972 | Flux | 416/123 |
| 4,697,986 A | | 10/1987 | David | |
| 4,881,874 A | * | 11/1989 | White et al. | 416/138 |

OTHER PUBLICATIONS

International Preliminary Report on Patentability in PCT/US07/86266, mailed Jan. 31, 2011.

* cited by examiner

Primary Examiner — Edward Look
Assistant Examiner — Ryan H Ellis
(74) Attorney, Agent, or Firm — James E. Walton; Noah A. Tevis

(57) ABSTRACT

A rotor system for a rotorcraft includes a rotor having a plurality of pitch control links and a pair of rotor blades mechanically coupled with each of the plurality of pitch control links. A rotorcraft includes a power train, a mast extending from the power train, a rotor having a plurality of pitch control links, the rotor mechanically coupled with the mast, and a pair of rotor blades mechanically coupled with each of the plurality of pitch control links.

8 Claims, 3 Drawing Sheets

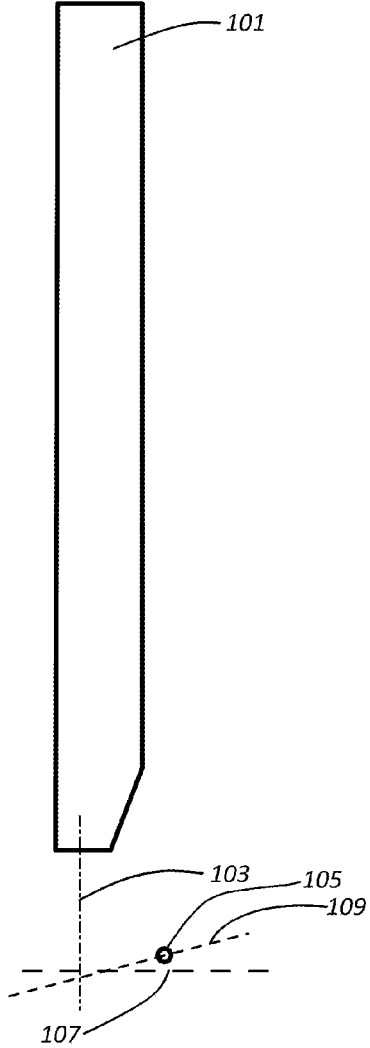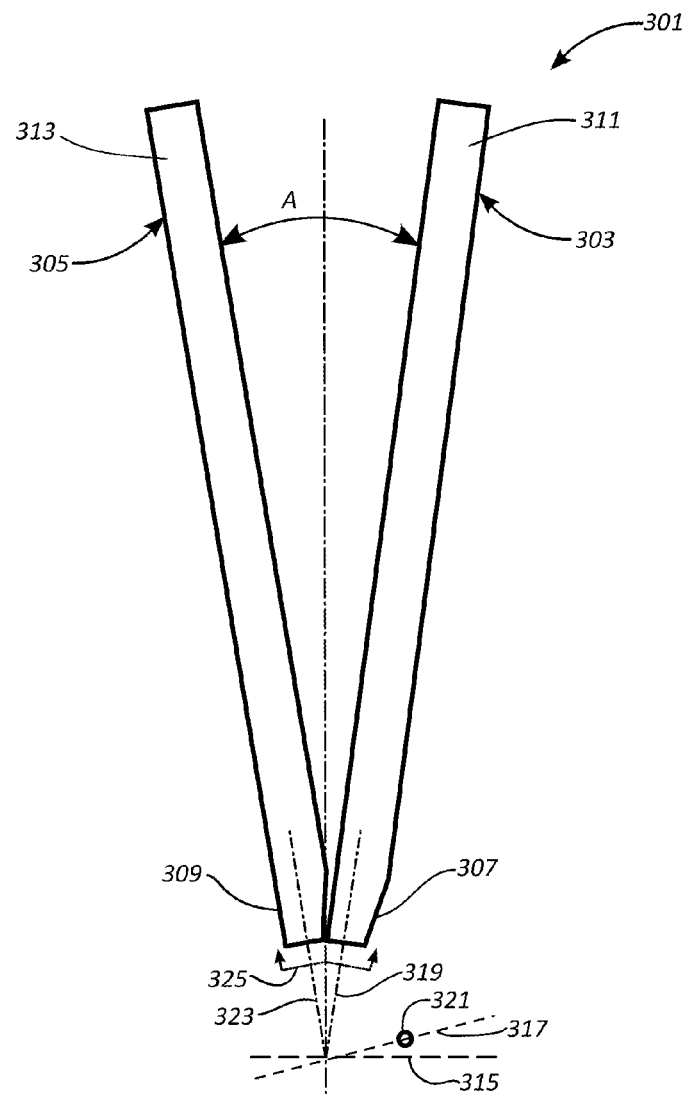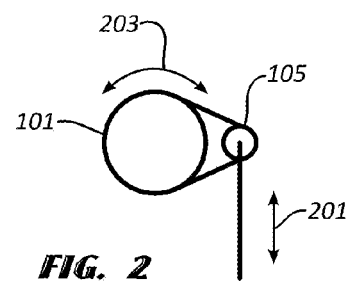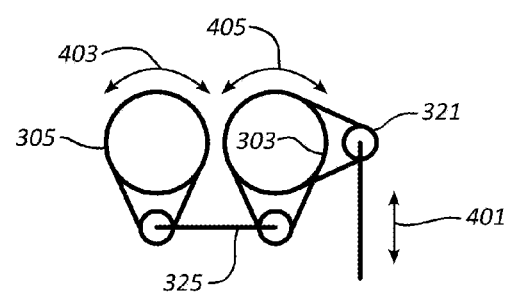
FIG. 1 (PRIOR ART)
FIG. 2 (PRIOR ART)
FIG. 3
FIG. 4

MULTI-BLADED ROTOR SYSTEM FOR ROTORCRAFT

TECHNICAL FIELD

The present invention relates in general to the field of rotor systems for rotorcraft.

DESCRIPTION OF THE PRIOR ART

There are many different types of rotorcraft, including helicopters, tandem rotor helicopters, tiltrotor aircraft, four-rotor tiltrotor aircraft, tilt wing aircraft, and tail sitter aircraft. In all of these rotorcraft, thrust and/or lift is generated by air flowing through a rotor disk formed by a plurality of rotating rotor blades. The plurality of rotor blades are mechanically coupled with and substantially evenly spaced about rotatable mast, which provides rotational motion to the plurality of rotor blades. Each of the plurality of rotor blades is independently rotatable to affect a pitch of the blade. Varying the pitch of the plurality of blades affects lift and the direction of thrust produced by the rotating plurality of blades.

FIG. 1 depicts an exemplary conventional rotor blade 101. Rotor blade 101 is rotated about a pitch axis 103 via a pitch control link 105 to affect the pitch of rotor blade 101. Shown in FIG. 2, as pitch control link 105 is moved in directions generally corresponding to double-headed arrow 201, rotor blade 101 rotates about pitch axis 103 (shown in FIG. 1) generally corresponding to double-headed arrow 203. Line 107 represents a flap axis of rotor blade 101 and line 109 represents a pitch/flap axis of rotor blade 101.

It is often desirable to utilize a greater number of rotor blades rather than a fewer number to increase the lift and/or thrust of a rotorcraft. As the number of rotor blades increases, however, the complexity of conventional rotorcraft rotor systems increases dramatically, in part because each of the rotor blades must be independently controlled. This increased complexity results in dramatic increases in weight and cost of such rotor systems.

There are many rotorcraft rotor systems well known in the art; however, considerable room for improvement remains.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 1 is a stylized, top, plan view of a conventional rotor blade and a pitch control link for the conventional rotor blade;

FIG. 2 is a schematic view of a control mechanism for the conventional rotor blade of FIG. 1;

FIG. 3 is a stylized, top, plan view of a rotor blade pair and a pitch control link for the rotor blade pair;

FIG. 4 is a schematic view of a control mechanism for the rotor blade pair of FIG. 3;

Figure 5:
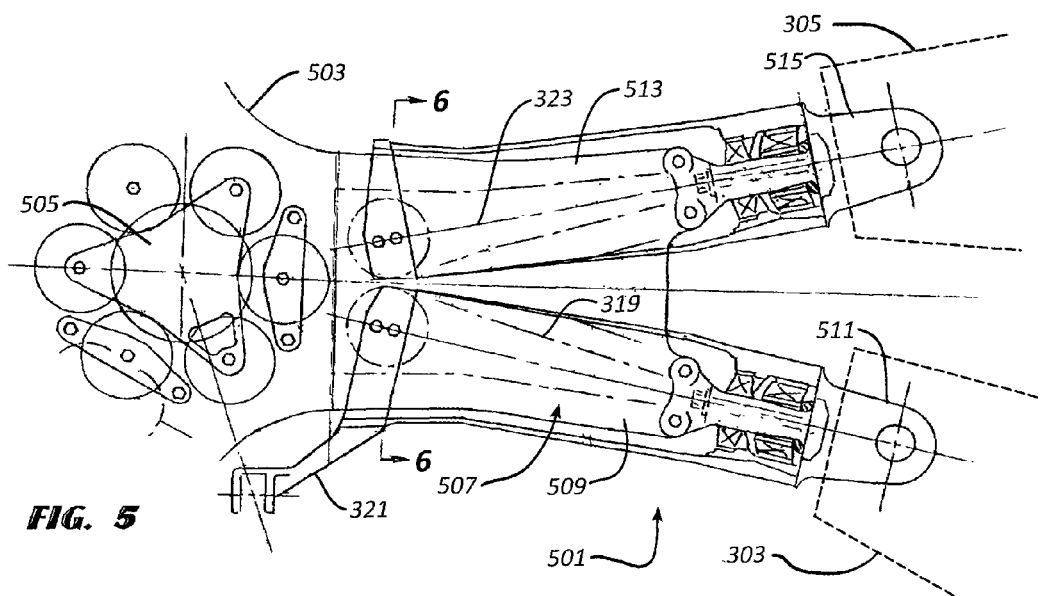
FIG. 5 is a partial top, plan view of a rotor system including the rotor blade pair of FIG. 3.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention represents a rotor system for a rotorcraft and a rotorcraft incorporating the rotor system. The rotor system includes a rotor having a plurality of pitch control links and a pair of rotor blades mechanically coupled with each of the plurality of pitch control links. When one of the pitch control links is actuated, pitch orientations of the corresponding pair of rotor blades is controlled. The individual rotor blades of a particular pair of rotor blades, however, is not independently controlled but controlled in tandem.

FIG. 3 depicts a stylized, schematic view of a rotor blade pair 301, comprising a first rotor blade 303 and a second rotor blade 305. Rotor blades 303 and 305 are held in a substantially fixed relationship to one another at root ends 307 and 309, respectively, as is discussed in greater detail herein. Rotor blades 303 and 305 are proximate one another at root ends 303 and 305 but are spaced apart from one another at tips 311 and 313, respectively, to form an angle A therebetween. In one embodiment, angle A formed by rotor blades 303 and 305 is about 20 degrees. Each of rotor blades 303 and 305 comprise airfoils capable of producing lift when air is moved over rotor blades 303 and 305. Line 315 represents a flapping axis of rotor blades 303 and 305. Line 317 represents a pitch-flap axis of rotor blades 303 and 305.

Still referring to FIG. 3, rotor blade 303 is rotatable about a first pitch axis 319 via a pitch control link 321 to affect the pitch of rotor blade 303. Similarly, rotor blade 305 is rotatable about a second pitch axis 323 via pitch control link 321 to affect the pitch of rotor blade 305. Rotor blades 303 and 305 are not separately rotatable but are coupled by rotor blade link 325. In other words, as shown in FIG. 4, when pitch control link 321 is moved in directions generally corresponding to double-headed arrow 401, first rotor blade 303 is rotated in directions generally corresponding to double-headed arrow 403 about first pitch axis 319, which, because rotor blades 303 and 305 are mechanically coupled by rotor blade link 325, causes second rotor blade 305 to be rotated about second pitch axis 323 in a directions generally corresponding to a double-headed arrow 405. Thus, one pitch control link 321 controls two rotor blades 303 and 305.

Figure 6:
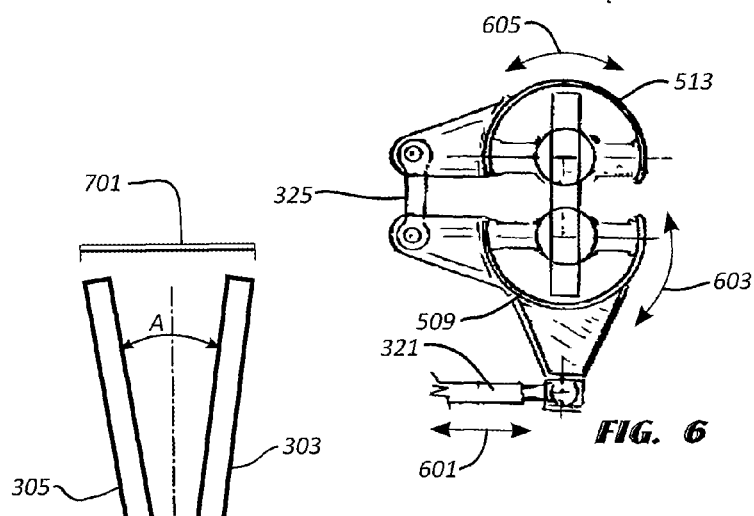
FIG. 6 is a cross-sectional view of the rotor system of FIG. 5, taken along the line 6-6 in FIG. 6.

FIGS. 5 and 6 depict one particular, illustrative embodiment of a rotor 501, which is configured to control the pitch of rotor blades 303 and 305, as discussed above. In the embodiment illustrated in FIG. 5, rotor 501 comprises a rotor hub 503 rotatable by a mast 505. A pitch control assembly 507 is attached to rotor hub 503 in a fashion to allow rotational movement of pitch control assembly 507 with respect to rotor hub 503 to effect pitch changes of rotor blades 303 and 305. Pitch control assembly 507 comprises a first pitch shaft 509 terminating in a lug 511 and a second pitch shaft 513 terminating in a lug 515. Root ends 307 and 309 (shown in FIG. 3) of rotor blades 303 and 305, respectively, are attached to pitch control assembly 507 via lugs 511 and 515, respectively. Pitch control link 321 is actuated in directions generally corresponding to a double-headed arrow 601, shown in FIG. 6, which is in directions generally perpendicular to the drawing sheet in FIG. 5. When pitch control link 321 is so actuated, first pitch shaft 509 of pitch control assembly 507 is rotated about first pitch axis 319, as indicated in FIG. 6 by double-headed arrow 603. As first rotor blade 303 is affixed to lug 511 of first pitch shaft 509, first rotor blade 303 is rotated about first pitch axis 319 in a corresponding fashion. Because second pitch shaft 513 is mechanically coupled with first pitch shaft 509 by coupling link 325, best shown in FIG. 6, second pitch shaft 513 of pitch control assembly 507 is correspondingly rotated about second pitch axis 323. As second rotor blade 305 is affixed to lug 515 of second pitch shaft 513, second rotor blade 305 is rotated about second pitch axis 323 in a fashion corresponding to the rotation of rotor blade 303 about first pitch axis 319.

Figure 7:
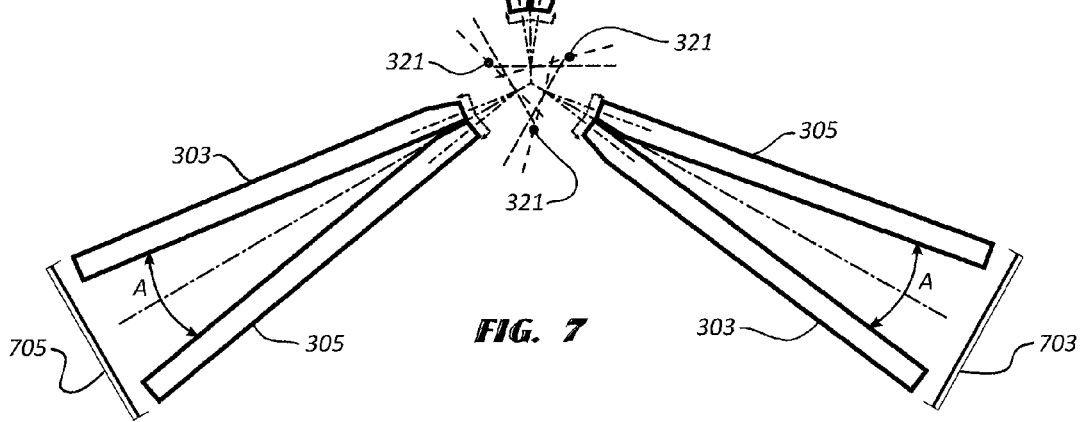
FIG. 7 is a stylized, top plan view of a plurality of rotor blade pairs and pitch control links for the plurality of rotor blade pairs.

FIG. 7 depicts an illustrative configuration of three rotor blade pairs 701, 703, and 705. It should be noted that each of rotor blade pairs 701, 703, and 705 correspond to rotor pair 301 of FIG. 3. Pitch settings for each of rotor blade pairs 701, 703, and 705 are controlled independently. As discussed herein, pitch configurations of rotor blades 303 and 305 are controlled in tandem for each rotor blade pair 701, 703, and 705. A center of rotation of mast 505 (shown in FIG. 5) is located at an intersection of pitch axes 319 and 323 of rotor blade pairs 701, 703, and 705. While FIG. 7 depicts three rotor blade pairs 701, 703, and 705, the scope of the present invention is not so limited. Rather, any suitable plurality of rotor blade pairs, such as rotor blade pairs 701, 703, or 705, may be used and the present invention contemplates such alternative embodiments.

Figure 8:
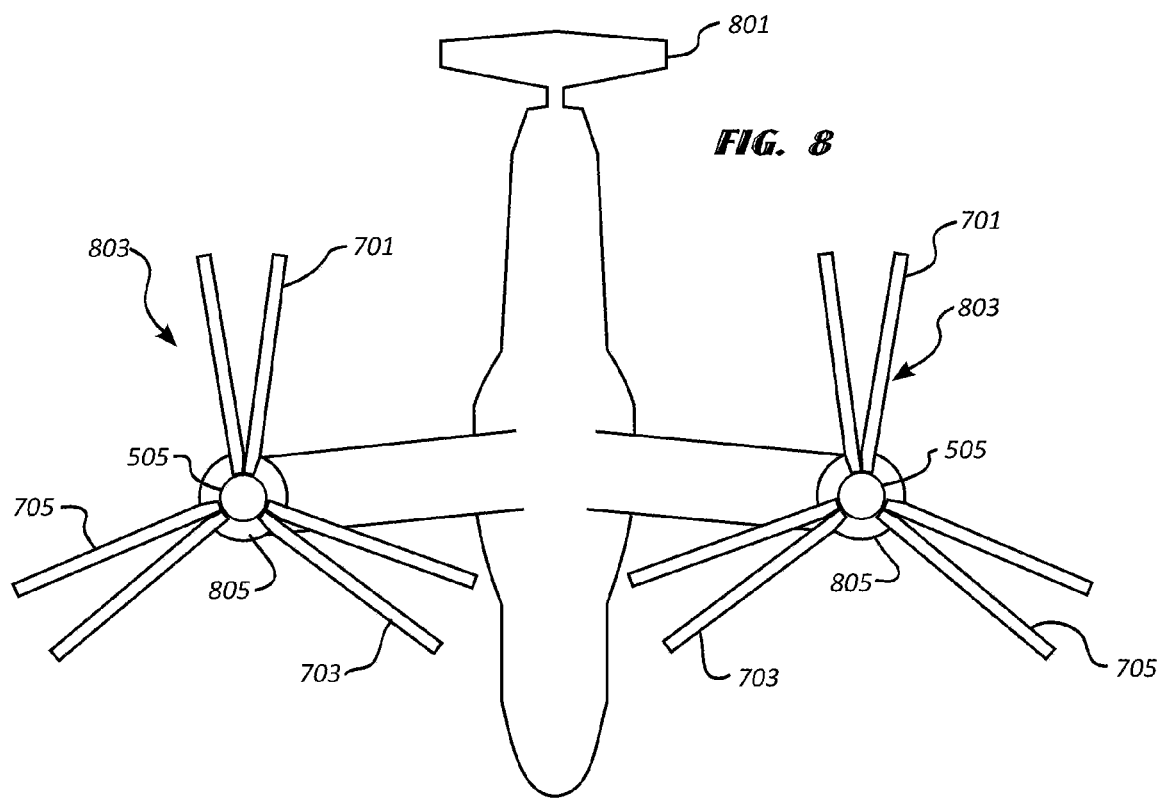
FIG. 8 is a stylized, top, plan view of a rotorcraft incorporating the rotor system of FIG. 5 with the plurality of rotor blade pairs in deployed, operational configurations.
Figure 9:
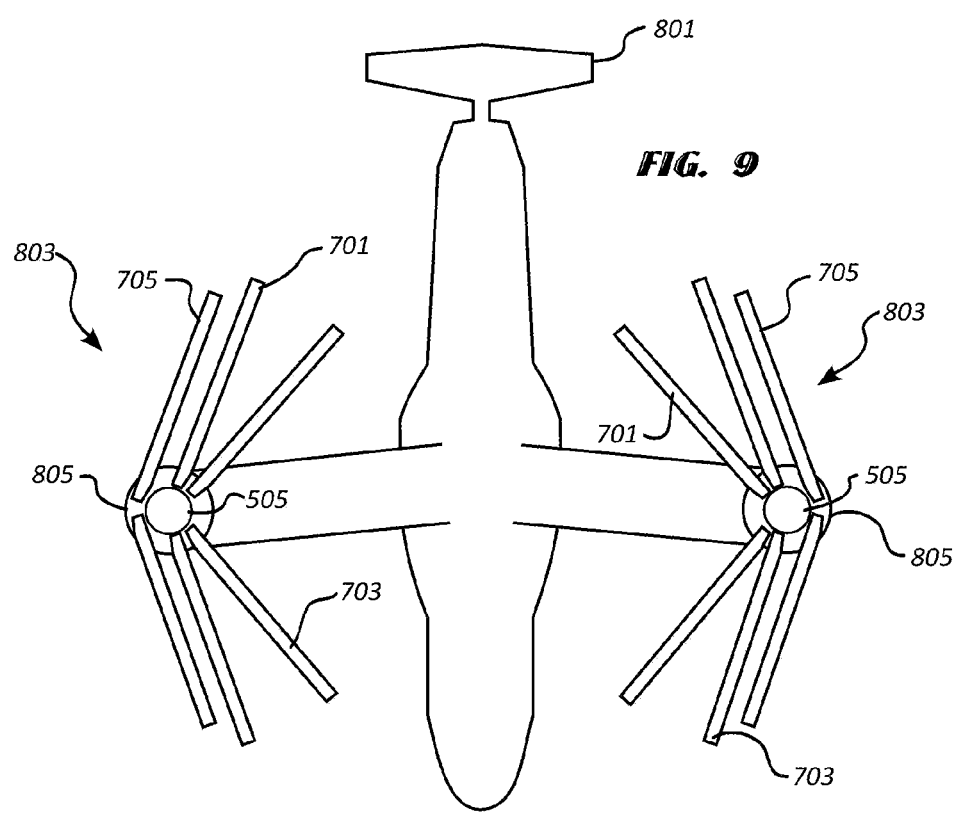
FIG. 9 is a stylized, top, plan view of the rotorcraft of FIG. 8, depicting the plurality of rotor blade pairs in folded, stowed configurations.

FIGS. 8 and 9 depict an illustrative embodiment of a rotorcraft 801 incorporating two rotors, such as rotor 501, and a plurality of rotor blade pairs, such as rotor blade pairs 701, 703, and 705, operably associated with each rotor 501. Rotor 501 and rotor blade pairs 701, 703, and 705 operably associated therewith make up a rotor system 803. Masts 505 (one shown in FIG. 5) extend from each power train 805 of rotorcraft 801. FIG. 8 depicts rotor blade pairs 701, 703, and 705 in deployed, operational configurations, while FIG. 9 depicts rotor blade pairs 701, 703, and 705 in folded, stowed configurations. It should be noted that, while rotorcraft 801 is depicted in FIGS. 8 and 9 as being a tiltrotor aircraft, the scope of the present invention is not so limited. Rather, the present invention contemplates rotorcraft 801 being any type of rotorcraft, such as a helicopter, a tandem rotor helicopter, a tiltrotor aircraft, a four-rotor tiltrotor aircraft, a tilt wing aircraft, or a tail sitter aircraft.

The present invention provides significant advantages, including: (1) providing a way to utilize more than three rotor blades in a rotorcraft without the added complexity found in conventional rotorcraft having more than three blades; (2) providing a way to utilize more than three rotor blades in a rotorcraft without the added control mechanism weight found in conventional rotorcraft having more than three blades; (3) providing a rotor system that requires lower control loads to operate; (4) providing a rotor system having more than four blades that exhibits improved flap-lag stability as compared to conventional rotor systems having four blades; and (5) providing a simplified, lower weight rotor system that is capable of controlling pitch-flap coupling, especially in tiltrotor aircraft.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A rotor system for a rotorcraft, comprising:
a first pair of rotor blades, comprising:
    a first rotor blade and a second rotor blade;
    a first pitch control link operably associated with the first rotor blade;
    a first coupling link coupled between the first rotor blade to the second rotor blade;
    wherein actuation of the first pitch control link changes a first pitch setting associated with the first rotor blade and the second rotor blade;
a second pair of rotor blades, comprising:
    a third rotor blade and a fourth rotor blade;
    a second pitch control link operably associated with the third rotor blade;
    a second coupling link coupled between the third rotor blade to the fourth rotor blade;
    wherein actuation of the second pitch control link changes a second pitch setting associated with the third rotor blade and the fourth rotor blade;

wherein the first pitch setting is independently controlled by the first pitch control link, while the second pitch setting is independently controlled by the second pitch control link;

wherein the first, second, third, and fourth rotor blades are generally in the same plane.

2. The rotor system, according to claim 1, further comprising:
a first pitch shaft mechanically coupled with the first pitch control link and the first rotor blade;
a second pitch shaft mechanically coupled with the second pitch control link and the third rotor blade.

3. The rotor system, according to claim 2, wherein:
the first pitch shaft terminates in a lug at which the first rotor blade is attached; and
the second pitch shaft terminates in a lug at which the second rotor blade is attached.

4. The rotor system, according to claim 1, wherein the first rotor blade is angularly spaced apart from the second rotor blade by an angle of about 20 degrees.

5. A rotorcraft, comprising:
a power train;
a mast extending from the power train;
a first pair of rotor blades, comprising:
 a first rotor blade and a second rotor blade;
 a first pitch control link operably associated with the first rotor blade;
 a first coupling link coupled between the first rotor blade to the second rotor blade;
 wherein actuation of the pitch control link changes a first pitch setting associated with the first rotor blade and the second rotor blade;
a second pair of rotor blades, comprising:
 a third rotor blade and a fourth rotor blade;
 a second pitch control link operably associated with the third rotor blade;
 a second coupling link coupled between the third rotor blade to the fourth rotor blade;
 wherein actuation of the second pitch control link changes a second pitch setting associated with the third rotor blade and the fourth rotor blade;
wherein the first pitch setting is independently controlled by the first pitch control link, while the second pitch setting is independently controlled by the second pitch control link;
wherein the first, second, third, and fourth rotor blades are generally in the same plane.

6. The rotorcraft, according to claim 5, further comprising:
a first pitch shaft mechanically coupled with the first pitch control link and the first rotor blade;
a second pitch shaft mechanically coupled with the second pitch control link and the third rotor blade.

7. The rotorcraft, according to claim 6, wherein:
the first pitch shaft terminates in a lug at which the first rotor blade is attached; and
the second pitch shaft terminates in a lug at which the second rotor blade is attached.

8. The rotorcraft, according to claim 5, wherein the first rotor blade is angularly spaced apart from the second rotor blade by an angle of about 20 degrees.

* * * * *